United States Patent [19]
Clement

[11] Patent Number: 5,214,893
[45] Date of Patent: Jun. 1, 1993

[54] COMPRESSION FRAMING SYSTEM

[75] Inventor: Charles E. Clement, Takoma Park, Md.

[73] Assignee: Lumaka Corporation, Takoma Park, Md.

[21] Appl. No.: 533,859

[22] Filed: Jun. 6, 1990

[51] Int. Cl.[5] .............................................. E04C 3/26
[52] U.S. Cl. ................................... 52/223.6; 52/477; 403/403; 160/377
[58] Field of Search ................... 160/377; 52/241, 227, 52/475, 476, 477, 656, 658; 403/403

[56] References Cited

U.S. PATENT DOCUMENTS

| | | | |
|---|---|---|---|
| 237,829 | 2/1881 | De Coursey | 160/377 |
| 1,391,602 | 9/1921 | Abramson | 52/585 |
| 1,645,609 | 4/1927 | Maxwell | 269/108 |
| 3,224,754 | 12/1965 | Graham | 269/108 |
| 3,812,609 | 5/1974 | Volden | 40/155 |
| 4,134,439 | 1/1979 | Scott | 160/377 |
| 4,279,288 | 7/1981 | Lanier | 160/377 |

Primary Examiner—David A. Scherbel
Assistant Examiner—Joanne C. Downs

[57] ABSTRACT

A modular system of structural framing in which a multiplicity of pre-stressed compression frame modules are combined into frameworks of any required size by use of common connecting means such as plates and brackets. Each compression frame module comprises a plurality of framing members forming a polygonal frame, and a loop means longitudinally encircling the frame. Tension is applied to the loop. The ends of the framing members are shaped to provide a non-invasive means of engaging and joining abutting framing members. The tensioned loop serves as the single fastener holding the module together while simultaneously pre-stressing the module by putting it into compression, thereby achieving a synergistic strength. Additionally, separate non-invasive joints and a removable double-cam clamping device are provided to improve the functionality of the system and to facilitate use of interchangeable parts.

10 Claims, 4 Drawing Sheets

COMPRESSION FRAMING SYSTEM

INTRODUCTION

This invention relates generally to building components, and more particularly to a pre-stressed modular framing system.

The impetus to devise this invention was a need for a modular system of wood framing to facilitate deployment of outdoor privacy screening. The privacy screens for which this framing system has been invented are glazed with translucent fiberglass reinforced plastic—material that blurs images, thus providing visual privacy while transmitting sunlight. In such an application, known framing methods were found to produce frameworks that did not facilitate modular construction, that devoted insufficient surface area to the light-transmitting material, and that were not strong enough to withstand wind and weather.

BACKGROUND

In the several arts related to methods or manufacturing and construction of frames and frameworks It is known in the manufacturing arts to employ longitudinally extending members such as metal straps laterally around a formation of staves or the like to hold the pieces together into a container such as a barrel.

It is known in the picture framing arts: to employ a cord or other longitudinally extending member as the means of holding an ornamental picture frame together; and to use clamping devices that employ a cable and fittings to hold framing members for fastening with nails or glue.

It is known in the building arts: to form rigid members into static frameworks by using fasteners, adhesives, welds, etc.; to use cables to permanently suspend structures such as bridges; to use a cable with fittings to hold concrete forms together while the concrete solidifies; and to incorporate a tensioned cable in a cementitious structural formation as a means of pre-stressing it against the forces of its load.

The methods common to static framing, especially the practice of using adhesives or metal fasteners to fix rigid framing members together into a rigid static construct, do not produce light-weight frameworks able to withstand forces of wind and weather, and do not make utilization of interchangeable parts practical. Additionally, conventional piercing metal fasteners damage the integrity of framing members, thereby reducing their strength and longevity, and glue technology is time- and labor-intensive, and thus expensive to utilize in manufacturing.

In light of the synergy achieved in pre-stressing of concrete by cable-induced compression and the resulting enhancement of the material's natural characteristics, the present invention proceeds to apply this principal of pre-stressing to modular framing. For reference in determining how best to adapt cable compression pre-stressing to such a system of modular framing, the methods of skeletal framing were examined. In skeletal frames, rigid bone members are held in a framework by tendons and tensioned muscles, with non-invasive joints at the intersection of bones. While the present invention is not intended to fulfill a requirement to produce a framework that is ambulatory or as flexible as, say, a human skeleton, it has drawn upon anatomical construction in determining the manner in which the tensioned cable loop engages the intersections of the rigid frame members of each framing module.

OBJECTS OF THE INVENTION

The chief object of this invention is to provide a system of modular framing in which the modules can be made of interchangeable parts, easily assembled into extensive modular structures of any required size, and thereafter easily disassembled as required for repair, maintenance, or replacement.

Another object of this invention is to provide a modular framing system of superior strength, such that a strong, lightweight framework can be constructed.

Another object of this invention is to provide a modular framing system with structural flexibility, such that typical stress conditions may induce temporary distortion but no permanent damage.

Another object of this invention is to provide a framing module the manufacturing of which avoids adhesives and conventional invasive fasteners such as nails or screws.

Another object of this invention is to provide a system of modular framing the component parts of which can be engineered to satisfy the requirements of varied specific applications other than privacy screening; for example: load-bearing walls; curtain walls and other non-load-bearing partitions; frames within frames such as those required for windows and doors; and domes. The embodiment disclosed in the drawings is built from rectangular compression frames extending to make a framework in a single plane—which in turn may be connected to another such framework in a second plane or may be connected to an existing structure. To make a framework extending out into several planes, as in the case of a dome, the compression frame's rigid members might typically be three or five in number and reveal a non-rectangular cross-section in order to facilitate the abutment of frames in the three-dimensional configuration.

BRIEF DESCRIPTION OF THE DRAWINGS

FIG. 3 is a section view of a compression frame through a pulley corner piece, viewed as indicated in FIG. 2a.

DESCRIPTION OF THE PREFERRED EMBODIMENT

Figure 1:
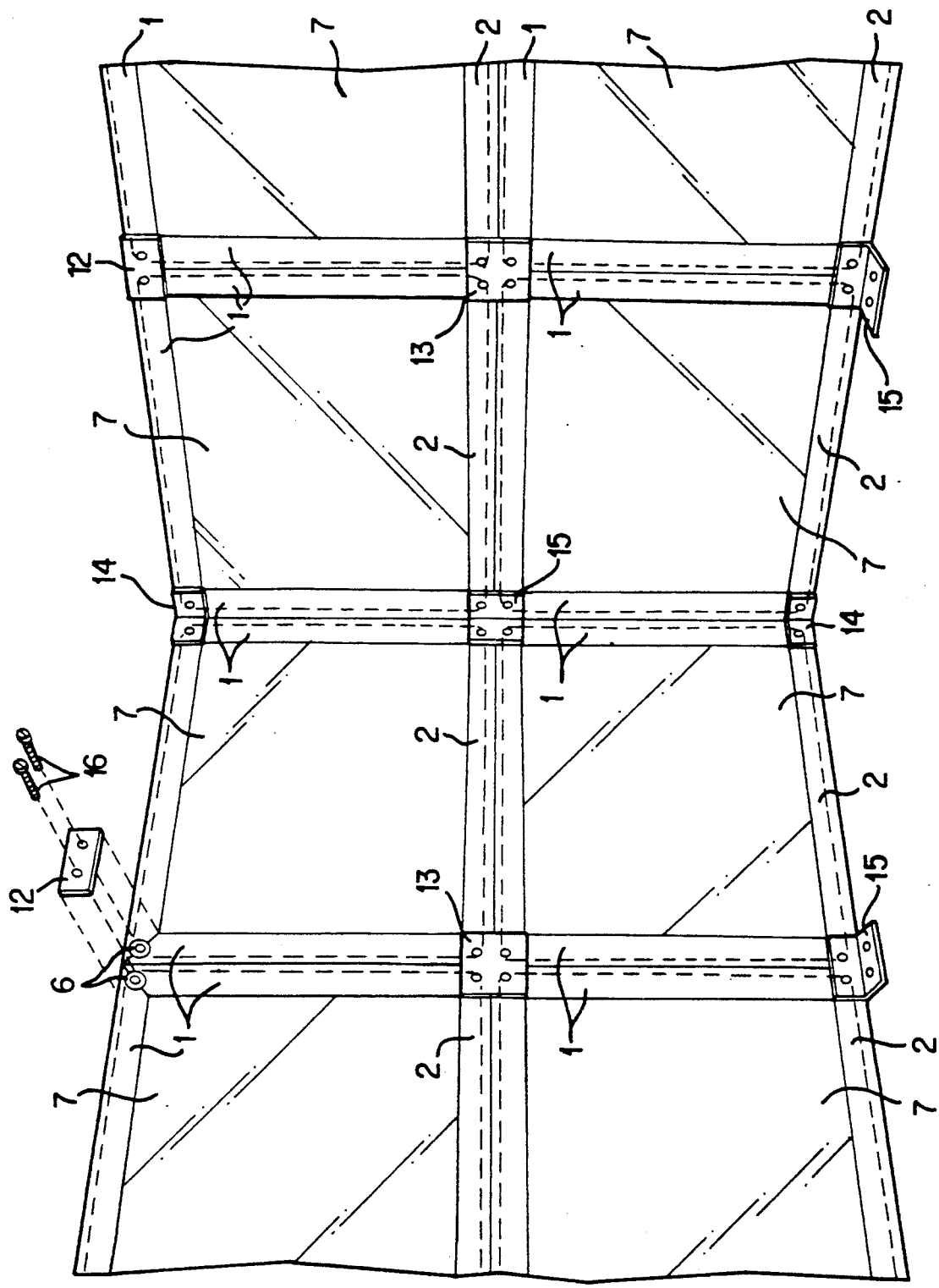
FIG. 1 is a perspective view showing a right-angle intersection of a multiplicity of compression framing modules in a two-frame-high configuration.

A system of modular framing in accordance with the invention as shown in FIG. 1 is comprised of a multiplicity of discrete pre-stressed compression frame modules combined together into a modular framework by the employment, as required, of two hole plate 12 or four hole plate 13, and two hole bracket 14 or four hole bracket 15, with bolts 16.

Figure 2A:
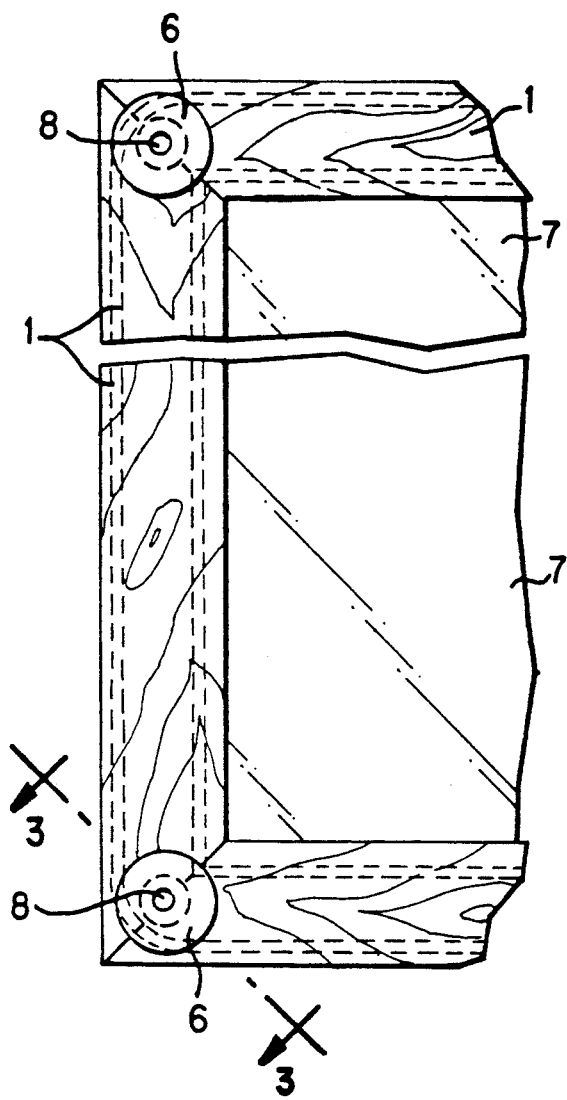
FIG. 2a is an elevation view of the left half of an individual compression frame module using a pulley-type corner piece.
Figure 2B:
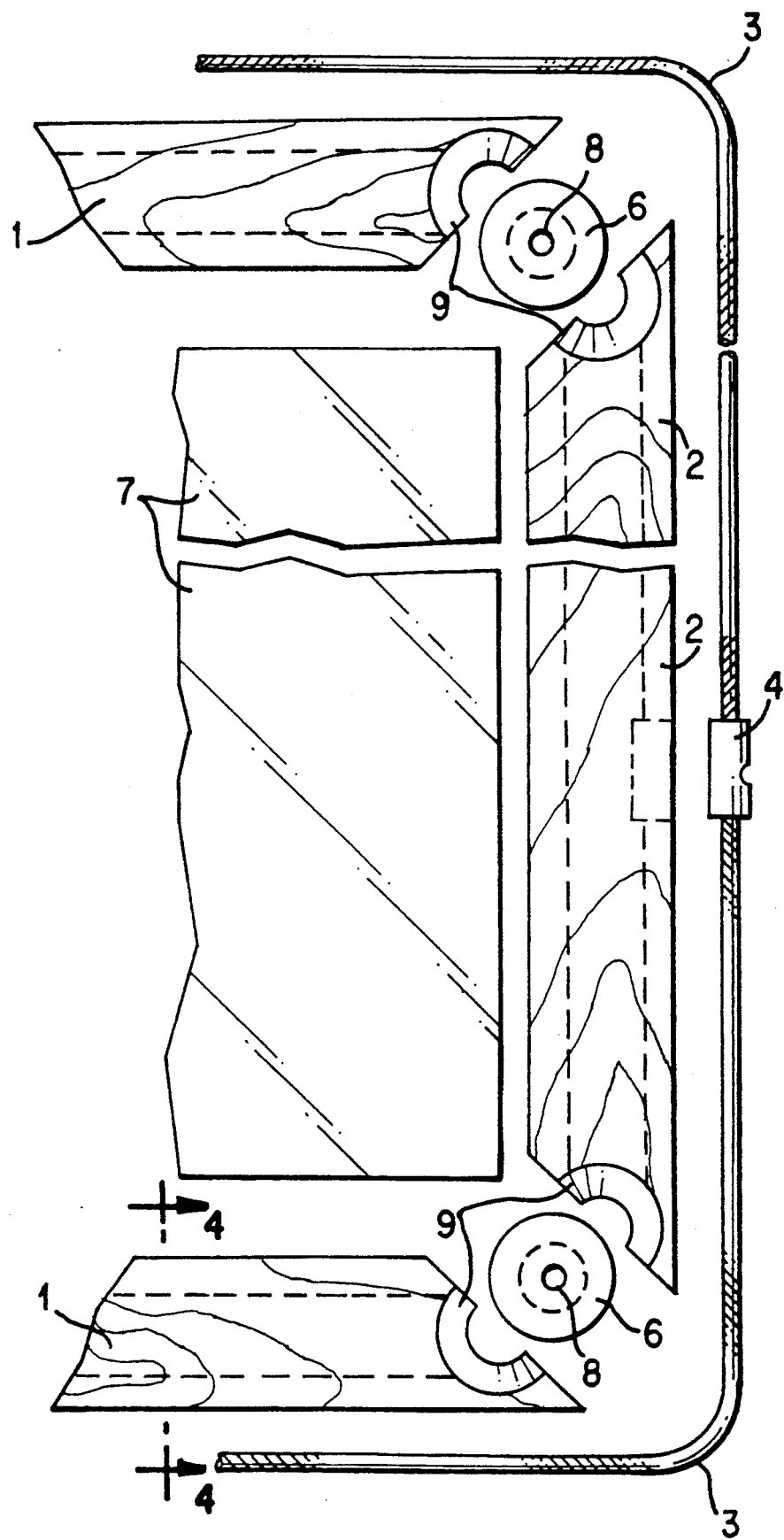
FIG. 2b is an exploded view of the right half of the frame as shown in FIG. 2a, showing the component parts.
Figure 5:
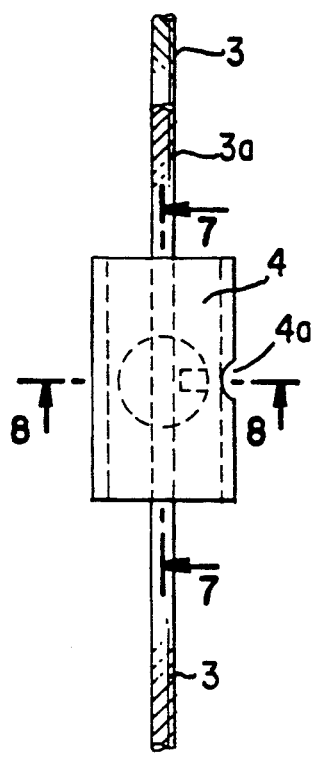
FIG. 5 is an enlarged, detailed view of the cable loop clamping device, in the same view shown in FIG. 2b.

As depicted in FIG. 2a and FIG. 2b, each cell of this framing system is a compression frame module comprised of: three rigid framing members 1 and one rigid framing member 2; four pulley-type corner pieces 6; light 7; cable loop 3; and two-part cable loop clamp 4,5. Rigid framing member part 2 differs from part 1 only in that it is grooved as depicted in FIG. 2b to receive cable clamp housing 4. Corner piece 6 (and 17 in FIG. 9 and FIG. 10) is provided with threaded hole S for bolts 16 to secure connecting plates 12, 13, and brackets 14, 15. The center of threaded hole 8 is located at the intersection of the center lines of the faces of rigid corner pieces 1,2.

Figure 3:
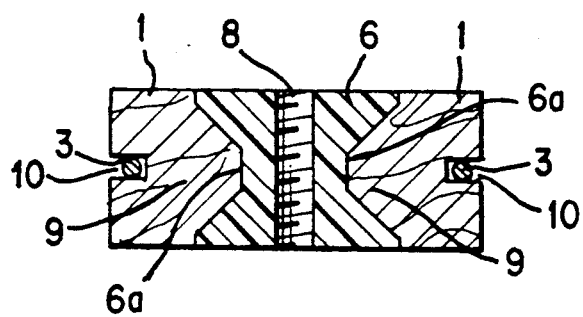

FIG. 3 depicts a section through the intersection of two framing members 1 engaging a pulley-type corner piece 6; this figure would be no different if one framing member was part 2 instead of part 1.

Figure 4:
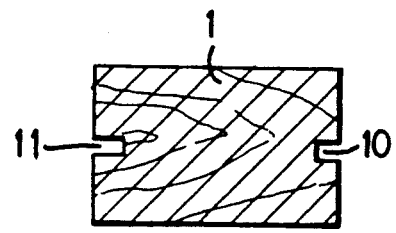
FIG. 4 is a section view of a rigid framing member of a compression frame, viewed as indicated in FIG. 2b.

FIG. 4 depicts a section through a rigid framing member 1, showing groove 10 for cable loop 3 and groove 11 for light 7; this figure would be different for framing member 2 only if the section was taken through the groove cut for cable clamp housing 4.

Assembly of a rectangular compression frame module proceeds as follows: three rigid framing members 1 and one rigid framing member 2 are introduced around the perimeter of light 7 by inserting each edge of light 7 into groove 11 of each framing member. At each intersection of framing members 1 and 1 or 1 and 2 a pulley-type corner piece 6 is placed, engaged by the shaping 9 on each end of each framing member 1,2.

Once the parts are arranged as described, cable loop 3 is caused to longitudinally encircle the module by its insertion in groove 10. Cable loop 3 engages each pulley corner piece 6 at the flat of its groove 6a, outbound of threaded hole 8.

Figure 6:
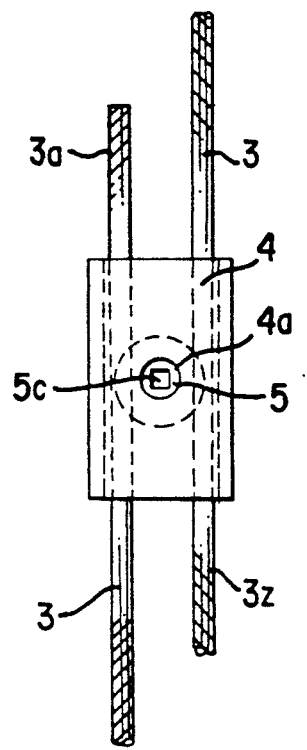
FIG. 6 is an enlarged elevation of the cable loop clamping device, as it would appear from the right side of FIG. 2b.
Figure 8:
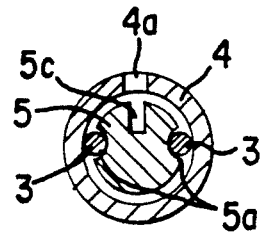
FIG. 8 is a transverse section view of the cable clamping device as indicated in FIG. 5, rotated counter-clockwise 90 degrees.

When the frame module is fully encircled, cable ends 3a and 3z are passed through tubular clamp housing 4 as shown in FIG. 6, with end 3a to the top left and 3z to the bottom right as viewed from the edge of the frame. Clamp housing 4 is aligned over its groove in rigid framing member 2, with key access hole 5c facing outward. Cam-action clamping sphere 5 is inserted into clamp housing 4 with grooves 5a engaging cable loop 3, this being done such that each set of teeth 5b in each groove 5a is respectively toward cable loop ends 3a and 3z, and with key socket 5c being centered beneath key access hole 4a. The two clamping sphere grooves 5a have each been formed with a depth that tapers such that key socket 5c serves as the center of the axis of rotation of the cams thus formed in two opposing the two grooves 5a.

Figure 7:
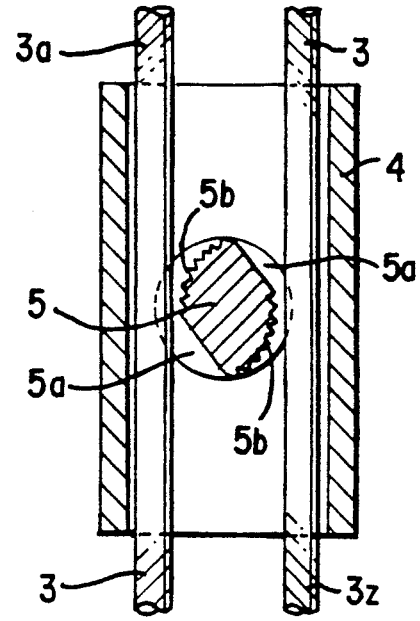
FIG. 7 is a longitudinal section view of the cable clamping device, as indicated in FIG. 5.

When all the component parts of the module are thus in place, cable loop ends 3a and 3z are gripped by a mechanical or hydraulic device with which to introduce tension on cable loop 3. After cable loop 3 is tensioned, a key is inserted in key socket 5c and turned so that the two sets of teeth 5b respectively and simultaneously engage cable ends 3a, 3z; in FIGS. 6 or 7, the key would be turned in a counter-clockwise direction. Clamping sphere 5 is held thus in its rotated position as cable ends 3a and 3z are released from the tension-inducing device.

Cable loop ends 3a, 3z recoil upon their release and cable loop 3 engages teeth 5b on each side of clamping sphere 5 and, so engaged, rotates sphere 5 farther in the direction of key-induced rotation to the point at which its double camming action causes both ends of cable loop 3 to be simultaneously jammed tight against opposite inside walls of tubular clamp housing 4. Thus held in a state of tension maintained by the cam-action clamp 4,5, cable loop 3 introduces compression longitudinally on the frame, thereby pre-stressing it.

Disassembly of a framework is simply a reversal of the assembly process described above, requiring the unbolting of plates and brackets and the removal of frame modules.

Disassembly of a framing module requires that cable loop 3 again be mechanically or hydraulically tensioned to allow the cable clamping sphere 5 to be rotated so as to disengage its two opposing toothed cams from respective opposing ends of the cable loop, 3a and 3z. Tension can then be released from cable loop 3, cable loop ends 3a, 3z can be pulled out of clamp housing 4, and any of the other parts can be easily removed from the module.

Figure 9:
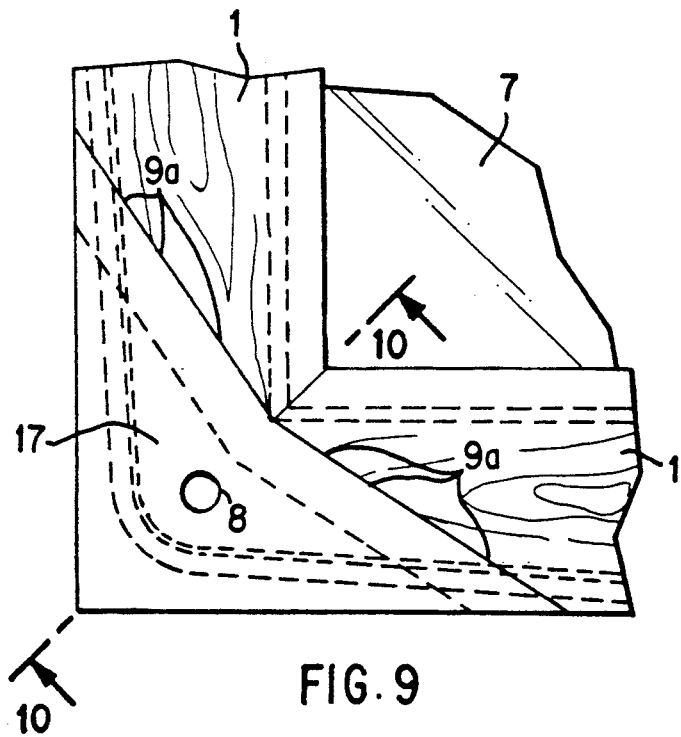
FIG. 9 is an elevation view of an alternative, pincer-type, non-invasive corner piece.
Figure 10:
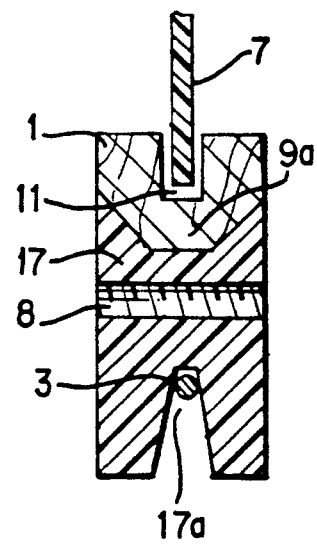
FIG. 10 is a section view—as indicated in FIG. 9—of the pincer-type corner piece.

In the alternative, as shown in FIG. 9 and FIG. 10, a pincer-type corner piece 17 can be employed instead of a pulley-type 6. Like pulley-type corner piece 6, said pincer-type corner piece 17 has a threaded hole 8 at the intersection of the center lines of the faces of the two rigid frame members 1,2 that it engages, and engages cable loop 3 in its groove 17a. Alternative shaping of framing members 1,2 so as to engage corner piece 17 is shown at 9a in FIG. 9 and FIG. 10.

SUMMARY AND SCOPE

Accordingly, the reader will see that the compression framing system of this invention can be used:
- to build frame modules entirely from interchangeable parts;
- to quickly fabricate and assemble compression frame modules;
- to quickly install frameworks of any size by connecting the required number of compression frame modules together;
- to achieve synergy with the material components, allowing compression frames to be built stronger, while using less material, than conventional static frames;
- to build frameworks that last longer by avoiding invasive fasteners that hasten degradation of framing members.

Although the description above contains many specificities, these should not be construed as limiting the scope of the invention but as merely providing illustrations of some of the presently preferred embodiments of this invention. Compression frame modules can be engineered to serve a wide variety of structural purposes. This invention provides a means for fabricating entire buildings wholly from interchangeable parts, and also provides a means for making many component parts, such as doors and windows.

Thus, the scope of the invention should be determined by the appended claims and their legal equivalents, rather than by the examples given.

I claim:

1. A structural framing unit comprising:
   (a) a plurality of longitudinally extending coplanar framing members abutting one another to form a polygonal frame; and
   (b) a loop means to which tension has been applied concurrent with its formation, said tensioned loop means extends longitudinally around said polygonal frame, thereby encircling said frame, whereby said tensioned loop means serves as the only fastener by which said polygonal frame is held together and as a means of prestressing said framing unit; and
   (c) each end of each said framing members being adapted to receive a corner piece; wherein the cooperation of said corner piece and said framing members assist in prestressing said framing unit and maintaining, under stress, the integrity and proper alignment of said framing members.

2. The structural framing unit of claim 1 further including fastening means for fastening together a multiplicity of said framing units, whereby said framing units can be easily aggregated to form extensive frameworks of any required size.

3. The structural framing unit of claim 1 wherein said separate corner piece is a pulley configuration.

4. The structural framing unit of claim 1 wherein said separate corner piece is a pincer configuration.

5. The structural framing unit of claim 1 wherein said tensioned loop means is made from cable material.

6. The structural framing unit of claim 1 further including a removable clamping device for securing said loop means in a tensioned state, said clamping device comprising the following two component parts:
   (a) a clamping piece comprising two opposing toothed cams that are radially symmetrical in respect to the axis of rotation of said clamping piece;
   (b) a housing to contain said clamping piece configured such that opposite ends of said loop means can pass from opposite directions through said housing and be clamped under tension against opposing inside walls of said housing by said two cams of said clamping piece, and also configured such that a means of rotating said clamping piece can be employed.

7. The structural framing unit of claim 1 further including in said clamping device a socket positioned at the center of said axis of rotation of said double-cam clamping piece whereby a common tool can be used as a key to rotate said double-cam clamping piece during assembly and disassembly of said structural framing unit.

8. The structural framing unit according to claim 7 wherein said two component parts of said clamping device are as follows:
   (a) a housing piece of tubular configuration, with a hole in the wall of said tubular housing to allow entry of said common tool to be used as said key to rotate said double-cam clamping piece during said assembly and disassembly of said compression frame modules;
   (b) a clamping piece of generally spherical shape, with a diameter slightly smaller than the diameter of the inside of said tubular housing, wherein said two opposing toothed cams are comprised within grooves provided therefor;

whereby said two component parts of said clamping device can be easily mated with each other and with said loop means, resulting in faster and easier assembly and disassembly.

9. The structural framing unit of claim 1 wherein slots in each said framing member are provided to contain said tensioned loop means as it longitudinally encircles said polygonal frame.

10. The structural framing unit of claim 1 wherein each of said framing members including longitudinal slots for receiving a panel of glazing or other material, thereby said glazing panel is securely held within the framing unit.

* * * * *